Patented Aug. 5, 1941

2,251,393

UNITED STATES PATENT OFFICE 2,251,393

COMPOSITION OF MATTER AND PROCESS FOR PREVENTING WATER-IN-OIL EMULSIONS RESULTING FROM ACIDIZATION OF CALCAREOUS OIL-BEARING STRATA

Charles M. Blair, Jr., Webster Groves, Mo., assignor to Petrolite Corporation, Ltd., Wilmington, Del., a corporation of Delaware No Drawing. Application August 17, 1940, Serial No. 353,128

18 Claims. (Cl. 166—21)

In my co-pending application Serial No. 353,126, filed August 17, 1940 and entitled improvements in "Certain high molal amino bodies, method of preparing same, and process for breaking petroleum emulsions," it was stated that the chemical compounds of the kind described in the said application are of value as surface tension depressants in the acidization of calcareous oil-bearing strata by means of strong mineral acid, such as hydrochloric acid. The present invention is concerned with such specialized application and also with solution in acid, for instance, hydrochloric acid, as a new composition of matter.

Thus, my present invention relates to the art or procedure commonly referred to as acidization of oil-bearing calcareous strata or the like, and which consists in introducing a strong mineral acid into an oil well for the purpose of causing the acid to disintegrate, dissolve, or re-act with the calcareous oil-bearing structure of the well, in a manner that results in an increase in the amount of crude petroleum obtained from the oil-bearing strata.

Many oil wells, after being subjected to acidization, produce emulsions, frequently of a very refractory nature, that have to be demulsified or subjected to chemical, electrical or similar treatment, in order to recover the oil or valuable constituent of the emulsion. My invention has for its main object to prevent the formation of objectionable water-in-oil type emulsions resulting from acidization of oil wells; or stated in another way, one object of my invention is to provide a process or procedure by which the oil-bearing calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions, which often follow conventional acidization, represent a transitory rather than a permanent situation, but even if lasting only for a few weeks, are extremely objectionable.

Another object of my invention is to provide a new composition of matter that is particularly adapted for use in the operation of acidizing the calcareous oil-bearing strata of a well, inasmuch as said composition will react with or act upon the calcareous structure in a way to increase the amount of crude petroleum obtainable from said structure, without however, converting said crude petroleum into an objectionable emulsion.

My new process, briefly stated, consists in causing an emulsion-preventing agent of the kind hereinafter described, to be mixed with, dissolved in, or commingled with the fluids, liquids, or liquid mixture in an oil well that has been subjected to or which is being subjected to acidization, prior to emergence of said fluids, liquids, or liquid mixtures from the well. Said emulsion-preventing agent consists of a chemical compound derived by a heat reaction involving, on the one hand, an alkylene polyamine containing at least three and not more than nine amino nitrogen atoms, and in which the alkylene group contains not over ten carbon atoms, and in which there is present at least one primary amino radical linked to a secondary amino radical through an alkylene radical; and on the other hand, a high molal monocarboxy amidification-reactive compound containing as a part thereof an acyl radical having not less than eight carbon atoms and not more than 32 carbon atoms, the ratio of said reactants being such that not more than 2 moles of the monocarboxy compound are employed per mole of polyamine, and in any event, so that there is present at least one primary amino radical linked through an alkylene radical to a secondary amino group for each mole of monocarboxy compound employed; said reaction being conducted at a temperature in excess of 250° C, and under such conditions so as to cause the elimination of all carbonyl oxygen atoms with the formation of a saponification and hydrolysis-resistant, cation-active compound.

In practising my process the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well or the liquids or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent along with the mineral acid, i. e., dissolved in said acid; and (c) Introducing the emulsion-preventing agent, preferably in aqueous solution, immediately after the introduction of the mineral acid.

The composition of matter that I have devised for acidizing the calcareous oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. My preference is to use hydrochloric acid, whose concentration is at least equal to approximately half-strength commercial 18° Bé. acid, as I have found that when such an acid is mixed with approximately 0.01% to 2.5% of the herein contemplated emulsion - preventing agent or agents, one obtains a new composition of matter that is perfectly stable and homogeneous, and which exhibits unusual properties, particularly when said acid mixture or new composition of matter is employed in the acidization of oil-bearing strata. However, I wish it to be understood that my invention, i. e., the new process and composition of matter herein described, is not restricted to the use of hydrochloric acid, but instead, contemplates the use of any suitable "strong mineral acid," several of which have previously been described as being usable in place of hydrochloric acid. Similarly, I wish it to be understood that the new composition of matter herein described may have other or additional uses, such for example, as in the acidization of oil-bearing strata, which do not produce emulsions. The hydrochloric acid or the like that is employed, may or may not have present other addition agents intended to make the acid particularly adapted to most localized conditions, which sometimes arise in the course of acidization. It should be emphasized that what is said hereinafter as to the utility and effectiveness of the composition of matter herein contemplated, applies with equal force and effect to the process which forms part of the present invention.

A number of problems have been involved in the introduction of strong mineral acid into oil-bearing strata of the kind containing calcium carbonate, magnesium carbonate, mixtures of same with siliceous material, or material which is dolomitic in character, and commonly referred to as calcareous structures. One problem is the prevention of corrosion, or damage to the metallic working parts of the well into which the acid is introduced. This has been overcome in various ways, such as by the use of an inhibitor. For the sake of brevity, reference is made to the following patents which give a cross-sectional view of the art relating to acidization, although there are in addition certain other practical elements which are well known:

U. S. Patents Nos. 1,877,504, dated Sept. 13, 1932, Grebe and Sanford; 1,891,667, dated Dec. 20, 1932, Carr; 1,911,446, dated May 20, 1933, Grebe and Sanford; 1,990,969, dated Feb. 12, 1935, Wilson; 2,011,579, dated Aug. 20, 1935, Heath and Fry; 2,024,718, dated Dec. 17, 1935, Chamberlain; 2,038,956, dated Apr. 28, 1936, Parkhurst; 2,053,285, dated Sept. 8, 1936, Grebe; 2,128,160, dated Aug. 23, 1938, Morgan; 2,128,161, dated Aug. 23, 1938, Morgan; and 2,161,085, dated June 6, 1939, Phalen.

As has been previously stated, in the acidization of oil-bearing calcareous strata or the like, it has been found necessary, in some instances, to add certain other materials or compounds which give additional desirable effects, at least under certain conditions. For instance, hydrofluoric acid or fluorides, have been added to intensify the action of the hydrochloric acid used to treat the well. Possibly this is related to the action on siliceous matter in the calcareous structure. The reason for the addition of inhibitors has been previously indicated. Sometimes it has been desirable to add tenacious foam-producing agents, such as glue, gelatin, or the like. In other instances, it has been desirable to add calcium sequestering compounds, such as sodium hexametaphosphate. In other instances reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

I have found that the materials or products which I contemplate adding to the hydrochloric acid or the like to produce my new composition of matter, or to act as an emulsion-preventing agent in my new process, do not interfere in any manner with the functional effect of other conventional acidizing addition agents. Of course, any single example may contain no additional agent at all; or it may contain one or more, depending upon the particular local conditions and use. As far as I am aware, the herein-contemplated compounds which are added to hydrochloric acid, or any other suitable mineral acid, such as a mixture of hydrochloride acid and hydrofluoric acid, do not replace other addition agents which have been added for various other purposes. For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions, when an oil well is turned into production after the acidizing operation. Many oil wells are acidized without subsequently producing any emulsions; or the emulsions, if produced, are self-resolving, or readily susceptible to any moderate breaking action. However, certain wells, particularly those located in western Kansas and certain wells in Illinois, when acidized by conventional processes, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stabiilty of the emulsion. The increased specific gravity differential should have a similar destabilizing effect. Actually, in a number of instances this is not the case, and such emulsions have resulted in unusual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength or somewhat weaker, is usually diluted with an equal quantity of water before it is used for acidization; i. e., the acid used in acidization may vary from 14% to 16.5% HCl, although acid varying in strength from 5% to 20% HCl has been employed. It is entirely feasible to add an agent to the acid as produced at the point of manufacture, thus exemplifying the composition of matter feature of the present invention. For instance, if desired, 0.02% to 5% of the contemplated agent may be added to the concentrated hydrochloric acid in manufacture. Such acid can be diluted to a suitable point before being employed in the acidization process. Thus, such concentrated acid can be diluted, for instance, half and half, so that the reagent is present in the dilute product within the ratio suggested previously, to wit, 0.01% to 2.5%. In many instances, the use of between 0.05% and 0.5% represents an acceptable average range.

In actual practice the hydrochloric acid obtained by a person or firm responsible for acidizing operations, may be used, in some instances, on oil-bearing strata, which do not form severe or refractory emulsions, and thus no advantage is obtained by adding a composition of the kind herein contemplated in comparison with ordinary acid. Then too, some calcareous oil-bearing strata which produce severe emulsions, may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acid has been indicated.

As has been previously suggested, one may also add to the acid intended for acidization, various other reagents or addition products of the kind described in the aforementioned list of patents, without affecting the operation of the emulsion-preventing agent that I employ, and without danger of said emulsion-preventing agent interfering with the effectiveness of such other acidization addition products. Likewise, it has been indicated that one need not necessarily employ my emulsion-preventing agent in the form of an addition agent, which is added to or mixed with the acid used in the acidizing step. Instead my emulsion-preventing agent may be introduced in suitable aqueous solution, preferably in fairly concentrated solution, for instance, 1–5%, prior to the acidizing step, or immediately after the acidizing step. The method of introduction is, of course, any conventional method, and preferably, employs the same apparatus and procedure used for introducing the acid. For convenience, however, and in the most preferred form, my invention is exemplified by employing as an integral part thereof the composition of matter herein contemplated, to wit, hydrochloric acid or the like, containing in stable admixture, agents of the kind subsequently to be described and within the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid, or its equivalent, or they are not soluble in spent brine of the kind previously mentioned, i. e., brine containing roughly equivalent to 20% of calcium chloride and having a pH of 3.5 to 5. Furthermore, if soluble at all they are generally decomposed; and if they do not decompose under ordinary conditions, they at least decompose under the conditions which involve the necessary time required for acidization. Then too, in some instances where such demulsifiers appear to meet all other requirements, they apparently precipitate out on the face of the pay sand or oil-bearing strata, and may even reduce instead of increase the oil production, as compared with results obtained by ordinary acid. There are a number of other reasons not necessary to explain, which prevent ordinary demulsifiers from being effective. It is possible that the characteristic properties of my new composition of matter herein described, make it adaptable for uses in other arts with which I am not acquainted; but it may be apparent to others. It is also possible that the stable admixture of the kind described, i. e., certain agents dissolved in strong mineral acid, have other properties which I have not investigated, and in view of such properties, such mixture is particularly adaptable for the particular use herein described.

The substances or materials previously referred to for breaking petroleum emulsions and which I employ in my new process and as a new composition of matter, are described in my said aforementioned co-pending application. It so happens that such substances or chemical compounds per se are new chemical compounds or compositions of matter, as far as I am aware; and more peculiarly, they must be described in terms of the method of manufacture, rather than in terms of chemical structure alone. For this reason, in order that the present disclosure of my invention will be complete enough to enable others to practice or make use of said invention, I will incorporate in substantially verbatim manner much of the subject-matter which appears in said previously mentioned co-pending application.

The compounds or compositions of matter herein employed in conjunction with an acid, such as hydrochloric acid, are obtained by reaction between high molal carboxy acids, particularly detergent-forming monocarboxy acids and polyalkyleneamines containing at least three nitrogen atoms, i. e., materials of the kind exemplified by diethylene triamine, triethylene tetramine, tetraethylene pentamine, etc. These last mentioned members are commonly referred to as ethylene polyamines and are considered as members of the broad class of alkylene polyamines. Ordinarily, the word "polyamine" is employed to include diamines, as well as amines having three or more nitrogen atoms. Insofar that all the amino compounds herein contemplated as raw materials are characterized by the fact that the polyamines must contain more than two nitrogen atoms, for the sake of simplicity and to avoid burdensome repetition, I will use the word "polyamine" both in the specification and in the hereto appended claims to mean polyamines having three or more nitrogen atoms, thus eliminating diamines from consideration, and eliminating from repeated use such burdensome language as "polyamine containing at least three amino nitrogen atoms."

Briefly stated, such polyamines are obtained by various reactions, but particularly by a reaction which involves ammonia and ethylene dichloride. However, instead of employing ethylene dichloride, one may employ propylene dichloride, butylene dichloride, amylene dichloride, hexylene dichloride, octylene dichloride, decylene dichloride, and the like, with the result that one may have present an alkylene group other than the ethylene group. My preference, however, is to employ compounds in which the alkylene group is represented by the ethylene radical. It is also to be noted that such compounds can be prepared from primary and secondary amines, as well as from ammonia, or by such amines in combination with ammonia. Furthermore, it is well known that such polyamines can be alkylated in substantially the same manner that ordinary monoamines or diamines are alkylated, for instance, treatment with an algylene halide. Thus, any alkyl group varying from a methyl to an octadecyl group, may be introduced. Similarly, one may introduce an alicyclic group, such as a cyclohexyl group or an aralkyl group, such as a benzyl group. It is understood that for the present purpose any hydrocarbon radical which does not alter the basic character of the amino nitrogen atom to which it is attached, is the obvious functional equivalent of an alkyl radical.

I have found that such alkylated polyamines are entirely satisfactory as a reactant for the production of the compositions of matter herein contemplated, provided that there is present at least one primary amine radical adjacent to a secondary amino radical. However, there is no limitation in regard to the presence or absence of other primary or secondary, or even tertiary, amino nitrogen radicals, except the molecule as a whole must contain at least 3 nitrogen atoms. For simplicity, the class of amines, which are suitable for preparing my condensation products, may be represented by the following formula:

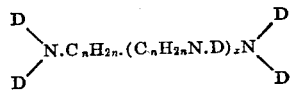

in which D stands for a hydrogen atom or an alkyl radical; $n$ stands for the numerals 1 to 10; and $x$ stands for a small number varying from 1 to 7, but preferably from 1 to 3; and there is the added proviso that there must be a primary amino group and a secondary amino group linked through a single alkylene radical. The last qualification means in essence that the following radical must appear at least once:

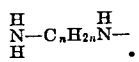

For all practical purposes I have found that the most valuable demulsifying agents are obtained by employing non-substituted ethylene polyamines of the following formula in which $x$ represents the numerals 1 to 3:

I have discovered that if an amine of the kind just described is reacted with a high molal carboxy acid or a high molal carboxy acid compound, and particularly with a detergent-forming acid or a detergent-forming acid compound, and that if one continues reaction at a temperature higher than heretofore commonly employed, and if such temperature is continued for a suitable period of time, one obtains a high molal amino body which is surface-active, particularly in the form of a salt. Furthermore, such product is relatively unaffected by reaction with water in the presence of an acid or a base, even though such reaction be conducted at the boiling point of the aqueous solution. Hence, such product may be considered as non-saponifiable. To be sure, long continued treatment with concentrated alkalies or acids under severe conditions may lead to some decomposition or hydrolysis; but the stability of these compounds, in comparison with amides, is so marked as to justify referring to them as being saponification- and hydrolysis-resistant. The general nature of these new products may be illustrated in the following manner:

If one indicates a high molal carboxy acid by R.COOH and if one selects diethylene triamine as an example of a suitable polyamine, then the first reaction between these two compounds may be indicated in the following manner, i. e., with the formation of a salt or "soap":

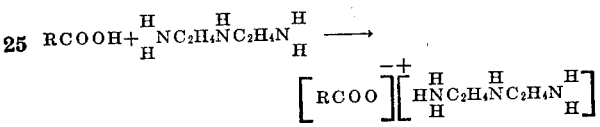

It is to be noted that neutralization or salt formation is indicated as involving the primary amine radical. Needless to say, alternately the reaction might involve the secondary amine radical, although this is immaterial.

If a soap or salt of the kind above described is then heated above the boiling point of water, for instance, anywhere in the temperature range of approximately 140 to 250° C., one obtains an amide. An amide formation may be indicated thus:

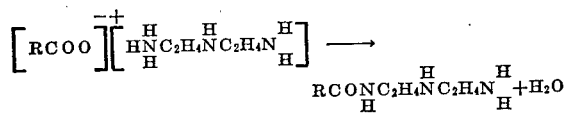

It is again to be noted that amidification may involve a secondary amino radical. This point again is immaterial.

Both of the products above described have a common characteristic: Instability towards acid. If the salt is reacted with an acid, for instance, hydrochloric acid, then the carboxy acid indicated by RCOOH is regenerated and one also forms a hydrochloride of the amine, to wit, diethylene triamine hydrochloride. Similarly, if one adds hydrochloric acid to the amide in the presence of water and boils under a reflux condenser, decomposition takes place with the formation of the carboxy acid RCOOH and the amine hydrochloride, as previously described. An alkali, such as caustic soda, will also act as a hydrolyzing agent, particularly if present in an amount more than sufficient to combine with any carboxy acid which may be generated. The result of such hydrolytic procedure is the formation of the sodium salt of the carboxy acid and the free amine. This is manifestly saponification.

If, however, after forming the amide at a temperature somewhere between 140° C. and possibly as high as 250° C., but usually not above 200–220° C. as a peak, one then heats such product at a higher range, approximately 250° C. to 280° C. or higher, say, possibly up to 300° C., for a suitable period of time, for instance, 2–3 hours; one can recover the equivalent of a second mole of water for each mole of carboxy acid employed; and the product so obtained after the evolution of a second mole of water has entirely different characteristics than either an amine salt or an amide. For instance, this difference may be exemplified by the fact that the product so obtained is stable in the presence of acid or alkali and cannot be hydrolyzed or saponified even when an aqueous solution is boiled in the presence of an acid or alkali. This inherently different property makes the material particularly adaptable for numerous purposes which will be hereinafter described.

I do not know the composition of this new product or products so obtained. There is no reason to believe that there is alteration or change in the hydrocarbon or hydroxylated hydrocarbon radical which is part of the acyl radical of the carboxy acid or carboxy acid compound employed. This may be illustrated in the following manner:

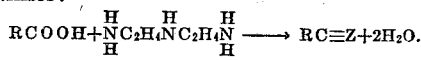

in which RC is a residue derived from the acid RCOOH, and the three residual valences which necessarily must be present, due to the elimination of the two oxygen atoms are satisfied by Z, in which Z is a radical of unknown composition derived from diethylene triamine or any other polyamine of the kind described which entered into the reaction. Sometimes during such reaction there may be evolved some slight amount of ammonia or a volatile amine. However, there is no molal relationship between the amount of ammonia or volatile amine evolved, and equally good results are obtained when one cannot detect the evolution of any ammonia or volatile amine. Thus, to the extent that such evolution of ammonia or volatile amine is concerned, it appears to be in the nature of a side reaction, and possibly an undesirable side reaction.

It is to be noted that the reaction or reactions involved are in all likelihood concerned with the formation of an amide as an intermediate step. Possibly, in such instances where the mixtures of reactants are immediately raised to a temperature of approximately 280° or thereabouts, then materials of the kind herein contemplated are formed without the necessity of amide formation; but for all practical purposes, it is entirely satisfactory to contemplate the reaction as involving an amide as an intermediate product. This being true, it is obvious that one need not employ an acid, but that any acid compound containing the selected acyl radical may be employed. For instance, an ester, acyl chloride, anhydride, or amide might be employed with the evolution of an alcohol, halogen hydride, ammonia, or the like, in the amidification step. This is comparable to the formation of the amide of a monoamine or diamine, and it does not require further elaboration. Thus, it becomes obvious that in the manufacture of the reagents of the kind herein contemplated, one may use an ester and particularly a naturally-occurring ester, such as a glyceride, instead of a fatty acid. There is no advantage in employing an acyl chloride; and in fact, such reactant is expensive and involves the formation of hydrochloric acid, which may be objectionable, since it combines with the amine to form a hydrochloride. Similarly, the use of an amide to form a higher boiling amide involves an unusually expensive reactant and would not ordinarily be employed. The anhydrides are usually more expensive than the acids. Thus, for all practical purposes the compositions of matter of the kind herein employed would involve the use of either the acid itself or the ester, particularly a naturally-occurring glyceride.

In the hereto appended claims, all references to the use of an acid are intended to include the obvious functional equivalents of the kind which have been enumerated. It is understood particularly that the expression "fatty acid" in the hereto appended claims includes within its scope the various esters, for instance, esters of monohydric alcohols as well as polyhydric alcohols; and thus it is particularly intended to include the glycerides.

The ordinary reactions of the kind most commonly described in the literature are concerned with salt formation and amidification. In the latter instance, the reaction involves the removal of the monovalently linked oxygen atom and not the divalently linked carbonyl oxygen atom; whereas, the present instance is concerned with a reaction which is essentially concerned with the removal of the divalently linked carbonyl oxygen atom.

It is to be noted in this connection that more than one acyl radical can react with a single polyamine, provided that there is at least one primary amino radical linked to a secondary amino radical through a single alkylene radical, for each radical introduced. This means that two acyl radicals, or, more exactly, two acyl radical residues, i. e., the radical RC derived from RCOOH, can be introduced into triethylene tetramine, tetraethylene pentamine, pentaethylene hexamine, and the like.

The expression "higher molecular weight carboxy acids" is an expression frequently employed to refer to certain organic acids, particularly monocarboxy acids, having more than 6 carbon atoms and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetyl-ricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils, such as those mentioned; hydroxy and alphahydroxy higher carboxylic aliphatic and fatty acids, such as dihydroxystearic acid, dihydroxy palmitic acid, dihydroxybehenic acid, alphahydroxy capric acid, alphahydroxystearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; aralkyl and aromatic acids, such as benzoic acid, Twitchell fatty acids, naphthoic acid, carboxydiphenyl pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc. Other suitable acids and esters include blown fatty acids and blown oils, such as blown rapeseed oil, blown castor oil, blown soyabean oil acids and the like. Reference in the claims to high molal carboxy acid compounds is intended to include such reactants.

The condensation of polyamines of the kind described with monobasic carboxy acid compounds may be carried out by simply heating the two components at a high temperature, usually above 250° C., until the reaction is complete, i. e., a carbonyl oxygen atom has been removed in the manner previously indicated. As has been indicated, the upper temperature range is in the approximate neighborhood of 300° C. The actual temperature at which the reaction takes place depends upon a number of factors, for instance, the nature of the material forming the reaction vessel, whether or not a vacuum has been employed, whether or not an inert gas is blown through the reacting mass during the operation, etc. In some cases organic solvents or diluents which do not react with either of the initial substances or with the final products, may be advantageously added. In order to illustrate operative conditions, particularly operating conditions employing glass-lined reacting vessels and employing atmospheric pressure, attention is directed to the following examples:

*Example 1*

215 g. of commercial oleic acid and 165 g. of triethylene tetramine were heated while stirring in a glass flask which carried a condenser and water trap. The temperature was held at 190–200° C. for 1 hour, after which time the evolution of water has ceased. Analysis of the trap contents showed it contained 13 g. of water. The temperature was then raised to 260° C., where the evolution of water again became apparent. The mixture was held at 260° to 300° C. for 5 hours. The total water evolved during the reaction was found to be 25.3 g., or just slightly less than 2 moles per mole of oleic acid in the starting materials.

The product was a thin oil, dispersible in water to form a paste, and clearly soluble in dilute acids to form soapy solutions of low surface tension.

The product remained soluble and soapy in dilute acids, even after refluxing for 6 hours in 10% alcoholic KOH.

*Example 2*

214 g. of stearic acid and 165 g. of triethylene tetramine were heated while stirring in a glass flask in an oil bath at 180–220° C. After 1 hour's heating about 13 g. of water had been evolved, and evolution of water had ceased. The temperature was then raised to 270–288° C. and held for 5 hours, during which time about 14 g. additional water were evolved.

The product was a brownish-yellow paste, soluble in dilute acetic acid to form a clear, foamy solution, and partly soluble in dilute and 15% HCl.

*Example 3*

210 g. of tetraethylene pentamine were substituted for the triethylene tetramine in Example 2. The period of heating and the temperature employed were almost the same as in Example 2. 26.5 g. of water were evolved. The product was similar in properties to that obtained in the previous example, except that it was somewhat more soluble in HCl solutions.

*Example 4*

225 g. of castor oil and 165 g. of triethylene tetramine were heated and stirred in an apparatus as described in Example 1. After 3 hours' heating at 200–240° C., only 2 ml. of water had been evolved. The product at this point was partly soluble in water and soluble in dilute acids, but was rapidly hydrolyzed on treatment with concentrated acids or alkalies. The temperature was raised to 255–275° C. and held for 7 hours, during which time 12.2 g. more water were evolved. The product was a clear red oil, soluble in dilute and concentrated acids and dispersible in water.

*Example 5*

225 g. of tung oil and 165 g. of triethylene tetramine were heated while stirring in a glass apparatus, as described in Example 1. The temperature was held at 200–255° C. for 2 hours, after which time 3 g. of water had been evolved. The product at this point was dispersible in water and dilute acids, but was easily hydrolyzed by warm mineral acids to give insoluble products. The temperature was then raised to 260–284° C. and held for 6 hours. 12.8 g. more of water were evolved during this period, giving a total of 14.8 g. of water. This was somewhat more than theory for one mole of water per tung oil carboxy acid radical. The greater part of this water was given up at temperatures above 275° C.

*Example 6*

450 g. of castor oil and 430 g. of tetraethylene pentamine were heated during stirring in an iron pot, loosely covered with an iron lid having two small holes through which the stirrer and thermometer passed. The mixture was quickly heated to a temperature of 200° C. and held between 200-220° for 3 hours. The product at this point was temporarily soluble in dilute acids, but was easily hydrolyzed by warm mineral acids. The mixture was then heated to 245° C. and held between 245° and 255° C. for 2½ hours. The final product, weighing 775 g. had properties very similar to the product of Example 4.

*Example 7*

Refined soyabean oil was substituted for castor oil in Example 6. The same procedure of this designated example was followed.

*Example 8*

Diethylene triamine was substituted for tetraethylene pentamine in Example 6. The method given in that example was employed.

*Example 9*

300 g. of castor oil and 100 g. of tetraethylene pentamine were heated and stirred in an apparatus, as described in Example 1. After one hour's heating at 200-240° C., 3 ml. of water had been evolved. The temperature was then raised to 267-296° C. and held for 2 hours, during which time 16 ml. additional water was evolved.

The product in the flask was a dark red oil, soluble in dilute acids, and partly soluble in 15% hydrochloric acid.

*Example 10*

300 g. of crude soyabean oil and 190 g. of tetraethylene pentamine were heated and stirred in an apparatus, as described in Example 1. After one hour's heating at 200-240° C., 4 ml. of water had been evolved. The temperature was then raised to 260°-280° C. and held for 4 hours, during which period 15.2 ml. additional water was evolved.

The product was a red oil, soluble in dilute acids and partly soluble in concentrated mineral acids.

*Example 11*

2400 g. of blown castor oil and 1520 g. of tetraethylene pentamine were heated and stirred in a closed steel vessel connected to a reflux condenser and trap. The temperature was raised to 275° C. and held for about 2 hours. 220 ml. of water were collected in the trap.

The product was a viscous, reddish oil, clearly soluble in dilute acids and in 15% hydrochloric acid, and having good demulsifying action on certain petroleum emulsions.

I have found that the most important exemplification of the present invention is concerned with derivatives in which the group RCO is furnished by an unsaturated fatty acid or a naturally-occurring glyceride, which consists of a mixture of esters of unsaturated acids, for example, castor oil, soyabean, linseed, teaseed, olive oil, cottonseed oil, etc.; and with the added proviso that only one radical be introduced into the polyamine, and with the added proviso that there be present at least 4, and preferably not more than 6, nitrogen atoms in the polyamine used as a raw material. My preference is to employ tetraethylene pentamine. Furthermore, in this preferred type, it is most desirable to use an unsubstituted polyamine, for instance, a polyamine free from any alkyl radicals or the like.

All the chemical compounds previously described are water-soluble as such, or when dissolved in dilute acid or acid of the concentration indicated. Such compounds may be combined not only with mineral acids, but also with organic acids, such as acetic acid, lactic acid, stearic acid, and the like. For this reason they can be used without difficulty in aqueous sludge as an emulsion-preventing agent by injecting such aqueous solution into the oil-bearing strata prior to acidization, or immediately after acidization. Such injection is made by conventional means, as, for example, the same apparatus or mechanical device employed for injecting acid into the well or oil-bearing strata. Furthermore, substantially all the compounds above described are soluble in hydrochloric acid of a strength corresponding to approximately 15%. Furthermore, substantially all the compounds of the type indicated are soluble in concentrated hydrochloric acid. Commercial hydrochloric acid is ordinarily available in grades from approximately 18° Bé., corresponding to approximately 28% anhydrous acid, to 22° Bé., corresponding to approximately 35.2% anhydrous acid. Some commercial hydrochloric acid is available in a strength which approximates the C. P. grade or slightly less than 37% anhydrous acid.

Needless to say, my new composition of matter can be prepared readily in any convenient form. The expression "new composition of matter" in this present instance is not intended to refer to the new compositions of matter described in my aforementioned co-pending application, but is intended to refer to the combination or mixture obtained by combining materials described in said aforementioned application with hydrochloric acid or the like, as has been described.

The selected compound may be dissolved in concentrated hydrochloric acid without dilution. The percentages employed have already been indicated. Such a concentrated hydrochloric acid may or may not contain some hydrofluoric acid. Likewise, if desired, the emulsion-preventing agent may be dissolved in water, and such aqueous solution added to the hydrochloric acid or the like, in order to dilute the same to the desired concentration. Another procedure, of course, is to dilute the hydrochloric acid to the desired concentration and add the particular chemical compound which has been selected as the emulsion-preventing agent. The percentage of chemical compound of the kind herein described is added within the range of 0.01% to 25%. It has been previously pointed out in the specification that one need not use the carboxy acid as such, but that any functional equivalent, for instance, an ester, acyl chloride, anhydride, or amine, might be employed with the evolution of an alcohol, halogen anhydride, ammonia, or the like, in the amidification step. With this in mind, the expression monocarboxy detergent-forming acid, fatty acid or the like is intended to include such obvious functional equivalents which react in the same manner as the acid to produce the same type of compound or condensation product.

Having thus described my invention, what I claim as new and desire to secure by Letters Patent is:

1. A process for preventing water-in-oil type emulsions resulting from acidization of calcareous oil-bearing strata, which consists in introducing into the cognate fluids of a well prior to emergence, a chemical compound derived by a heat reaction involving, on the one hand, an alkylene polyamine containing at least three and not more than 9 amino nitrogen atoms, and in which the alkylene group contains not over 10 carbon atoms, and in which there is present at least one primary amino radical linked to a secondary amino radical through an alkylene radical; and on the other hand, a high molal monocarboxy amidification-reactive compound containing as a part thereof an acyl radical having not less than 8 carbon atoms and not more than 32 carbon atoms, the ratio of said reactants being such that not more than 2 moles of the monocarboxy compound are employed per mole of polyamine, and in any event so that there is present at least one primary amino radical linked through an alkylene radical to a secondary amino group for each mole of monocarboxy compound employed; said reaction being conducted at a temperature in excess of 250° C., and under such conditions so as to cause the elimination of all carbonyl oxygen atoms with the formation of a saponification and hydrolysis-resistant, cation-active compound.

2. A process for preventing water-in-oil type emulsions resulting from acidization of calcareous oil-bearing strata, which consists in introducing into the cognate fluids of a well prior to emergence, a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, a detergent-forming monocarboxy acid; the ratio of such reactants being such that not more than 2 moles of the detergent-forming acid are employed per mole of polyamine, and in any event so that there is present at least one primary amino radical linked through an alkylene radical to a secondary amino group for each mole of detergent-forming acid employed; said reaction being conducted at a temperature in excess of 250° C., and under such conditions so as to cause the elimination of all carbonyl oxygen atoms with the formation of a saponification and hydrolysis-resistant, cation-active compound.

3. A process for preventing water-in-oil type emulsions resulting from acidization of calcareous oil-bearing strata, which consists in introducing into the cognate fluids of a well prior to emergence, a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, a fatty monocarboxy acid; the ratio of such reactants being such that not more than 2 moles of the fatty acid are employed per mole of polyamine, and in any event so that there is present at least one primary amino radical linked through an alkylene radical to a secondary amino group for each mole of fatty acid employed; said reaction being conducted at a temperature in excess of 250° C., and under such conditions as to cause the elimination of all carbonyl oxygen atom with the formation of a saponification and hydrolysis-resistant, cation-active compound.

4. A process for preventing water-in-oil type emulsions resulting from acidization of calcareous oil-bearing strata, which consists in introducing into the cognate fluids of a well prior to emergence, a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, an unsaturated fatty monocarboxy acid; the ratio of such reactants being such that not more than 2 moles of the unsaturated fatty acid are employed per mole of polyamine, and in any event so that there is present at least one primary amino radical linked through an alkylene radical to a secondary amino group for each mole of unsaturated fatty acid employed; said reaction being conducted at a temperature in excess of 250° C., and under such conditions so as to cause the elimination of all carbonyl oxygen atoms with the formation of a saponification and hydrolysis-resistant, cation-active compound.

5. A process for preventing water-in-oil type emulsions resulting from acidization of calcareous oil-bearing strata, which consists in introducing into the cognate fluids of a well prior to emergence, a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, an unsaturated fatty monocarboxy acid; the ratio of such reactants being in the proportion of one mole of unsaturated fatty acid per mole of polyamine; said reaction being conducted at a temperature in excess of 250° C., and under such conditions as to cause the elimination of the carbonyl oxygen atoms with the formation of a saponification and hydrolysis-resistant, cation-active compound.

6. A process for preventing water-in-oil type emulsions resulting from acidization of calcareous oil-bearing strata, which consists in introducing into the cognate fluids of a well prior to emergence, a chemical compound derived by a heat reaction involving, on the one hand, an ethylene polyamine containing at least 3 and not more than 9 amino nitrogen atoms, in which there is present at least one primary amino radical linked to a secondary amino radical through an ethylene radical; and on the other hand, unsaturated fatty monocarboxy acid; the ratio of such reactants being in the proportion of one mole of unsaturated fatty acid per mole of polyamine; said reaction being conducted at a temperature in excess of 250° C., and under such conditions so as to cause the elimination of the carbonyl oxygen atom with the formation of a saponification and hydrolysis-resistant, cation-active compound.

7. A process for preventing water-in-oil type emulsions resulting from acidization of calcareous oil-bearing strata, which consists in introducing into the cognate fluids of a well prior to emergence, a chemical compound derived by a heat reaction involving, on the one hand, an ethylene polyamine containing at least 4 and not more than 6 amino nitrogen atoms, in which there is present at least one primary amino radical linked to a secondary amino radical through an ethylene radical; and on the other hand, an unsaturated fatty monocarboxy acid; the ratio of such reactants being in the proportion of one mole of unsaturated fatty acid per mole of polyamine; said reaction being conducted at a temperature in excess of 250° C., and under such conditions so as to cause the elimination of the carbonyl oxygen atoms with the formation of a saponification and hydrolysis-resistant, cation-active compound.

8. A process for preventing water-in-oil type emulsions resulting from acidization of calcareous oil-bearing strata, which consists in introducing into the cognate fluids of a well prior to emergence, a chemical compound derived by a heat reaction involving, on the one hand, an ethylene polyamine containing at least 4 and not more than 6 amino nitrogen atoms, in which there is present at least one primary amino radical linked to a secondary amino radical through an ethylene radical; and on the other hand, an amidification-reactive ricinoleic acid compound; the ratio of such reactants being in the proportion of one mole of ricinoleic acid per mole of polyamine; said reaction being conducted at a temperature in excess of 250° C., and under such conditions so as to cause the elimination of the carbonyl oxygen atom with the formation of a saponification and hydrolysis-resistant, cation-active compound.

9. A process for preventing water-in-oil type emulsions resulting from acidization of calcareous oil-bearing strata, which consists in introducing into the cognate fluids of a well prior to emergence, a chemical compound derived by a heat reaction involving, on the one hand, an ethylene polyamine containing at least 4 and not more than 6 amino nitrogen atoms, in which there is present at least one primary amino radical linked to a secondary amino radical through an ethylene radical; and on the other hand, ricinoleic acid; the ratio of such reactants being in the proportion of one mole of ricinoleic acid per mole of polyamine; said reaction being conducted at a temperature in excess of 250° C., and under such conditions as to cause the elimination of the carbonyl oxygen atoms with the formation of a saponification and hydrolysis-resistant, cation-active compound.

10. A process for preventing water-in-oil type emulsions resulting from acidization of calcareous oil-bearing strata, which consists in introducing into the cognate fluids of a well prior to emergence, a chemical compound derived by a heat reaction involving, one mole of tetraethylene pentamine and one mole of ricinoleic acid; said reaction being conducted at a temperature in excess of 250° C. and under conditions so as to cause the elimination of the carbonyl oxygen atoms with the formation of a saponification and hydrolysis-resistant, cation-active compound.

11. A new composition of matter, comprising strong mineral acid, and a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, a fatty monocarboxy acid; the ratio of such reactants being such that not more than 2 moles of the fatty acid are employed per mole of polyamine, and in any event so that there is present at least one primary amino radical linked through an alkylene radical to a secondary amino group for each mole of fatty acid employed; said reaction being conducted at a temperature in excess of 250° C., and under such conditions as to cause the elimination of all carbonyl oxygen atoms with the formation of a saponification and hydrolysis-resistant, cation-active compound.

12. A new composition of matter, comprising hydrochloric acid whose concentration is at least equal to approximately half strength commercial 18° acid, and a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, an unsaturated fatty monocarboxy acid; the ratio of such reactants being such that not more than 2 moles of the unsaturated fatty acid are employed per mole of polyamine, and in any event so that there is present at least one primary amino radical linked through an alkylene radical to a secondary amino group for each mole of unsaturated fatty acid employed; said reaction being conducted at a temperature in excess of 250° C., and under such conditions as to cause the elimination of all carbonyl oxygen atoms with the formation of a saponification and hydrolysis-resistant, cation-active compound.

13. A new composition of matter, comprising hydrochloric acid whose concentration is at least equal to approximately half strength commercial 18° acid, and a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, an unsaturated fatty monocarboxy acid; the ratio of such reactants being in the proportion of one mole of unsaturated fatty acid per mole of polyamine; said reaction being conducted at a temperature in excess of 250° C., and under such conditions as to cause elimination of the carbonyl oxygen atoms with the formation of a saponification and hydrolysis-resistant, cation-active compound.

14. A new composition of matter, comprising hydrochloric acid whose concentration is at least equal to approximately half strength commercial 18° acid, and a chemical compound derived by a heat reaction involving, on the one hand, an ethylene polyamine containing at least 3 and not more than 9 amino nitrogen atoms, in which there is present at least one primary amino radical linked to a secondary amino radical through an ethylene radical; and on the other hand, an unsaturated fatty monocarboxy acid; the ratio of such reactants being in the proportion of one mole of unsaturated fatty acid per mole of polyamine; said reaction being conducted at a temperature in excess of 250° C., and under such conditions as to cause the elimination of the carbonyl oxygen atoms with the formation of a saponification and hydrolysis-resistant, cation-active compound.

15. A new composition of matter, comprising hydrochloric acid whose concentration is at least equal to approximately half strength commercial 18° acid, and a chemical compound derived by a heat reaction involving, on the one hand, an ethylene polyamine containing at least 4 and not more than 6 amino nitrogen atoms, in which there is present at least one primary amino radical linked to a secondary amino radical through an ethylene radical; and on the other hand, an unsaturated fatty monocarboxy acid; the ratio of such reactants being in the proportion of one mole of unsaturated fatty acid per mole of polyamine; said reaction being conducted at a temperature in excess of 250° C., and under such conditions so as to cause the elimination of the carbonyl oxygen atoms with the formation of a saponification and hydrolysis-resistant, cation-active compound.

16. A new composition of matter, comprising hydrochloric acid whose concentration is at least equal to approximately half strength commercial 18° acid, and a chemical compound derived by a heat reaction involving, on the one hand, an ethylene polyamine containing at least 4 and not more than 6 amino nitrogen atoms, in which there is present at least one primary amino radical linked to a secondary amino radical through an ethylene radical; and on the other hand, an amidification-reactive ricinoleic acid compound; the ratio of such reactants being in the proportion of one mole of ricinoleic acid per mole of polyamine; said reaction being conducted at a temperature in excess of 250° C., and under such conditions as to cause the elimination of the carbonyl oxygen atoms with the formation of a saponification and hydrolysis-resistant, cation-active compound.

17. A new composition of matter, comprising hydrochloric acid whose concentration is at least equal to approximately half strength commercial 18° acid, and a chemical compound derived by a heat reaction involving, on the one hand, an ethylene polyamine containing at least 4 and not more than 6 amino nitrogen atoms, in which there is present at least one primary amino radical linked to a secondary amino radical through an ethylene radical; and on the other hand, ricinoleic acid; the ratio of such reactants being in the proportion of one mole of ricinoleic acid per mole of polyamine; said reaction being conducted at a temperature in excess of 250° C., and under such conditions as to cause the elimination of the carbonyl oxygen atoms with the formation of a saponification and hydrolysis-resistant, cation-active compound.

18. A new composition of matter, comprising hydrochloric acid whose concentration is at least equal to approximately half strength commercial 18° acid, and a chemical compound derived by a heat reaction involving one mole of tetraethylene pentamine and one mole of ricinoleic acid; said reaction being conducted at a temperature in excess of 250° C. and under conditions so as to cause the elimination of the carbonyl oxygen atoms with the formation of a saponification and hydrolysis-resistant, cation-active compound.

CHARLES M. BLAIR, Jr.